B. H. ASHBY.
TRACTION BAND.
APPLICATION FILED AUG. 1, 1921.

1,419,533.

Patented June 13, 1922.
2 SHEETS—SHEET 1.

Inventor
B. H. Ashby
By Jack A. Ashley
Attorney

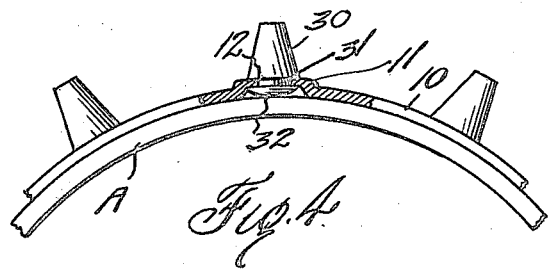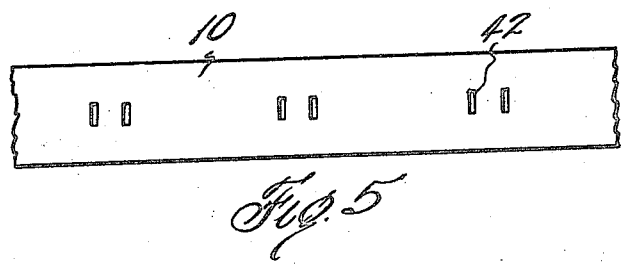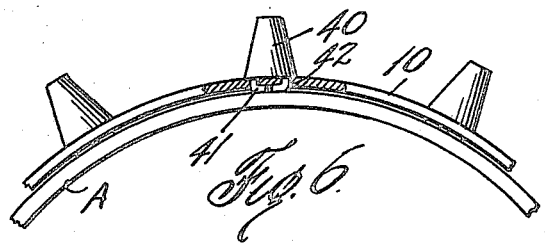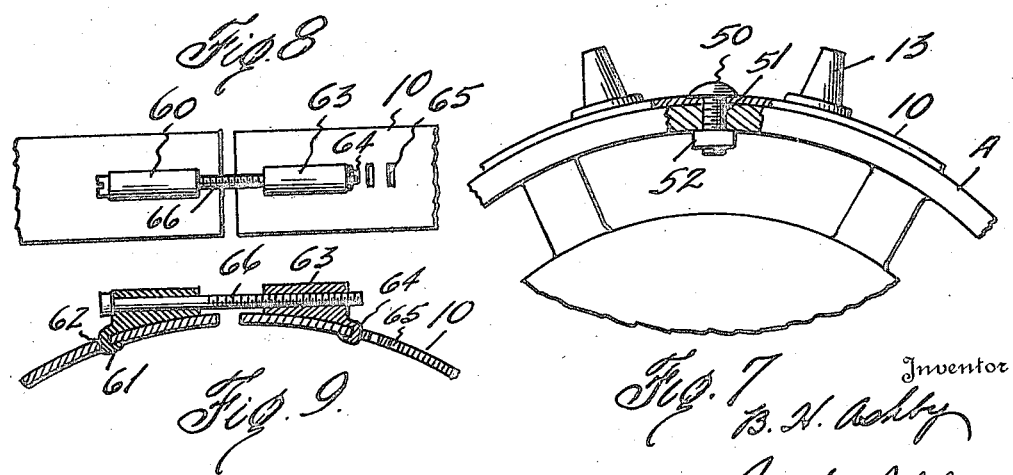

UNITED STATES PATENT OFFICE.

BRODIE H. ASHBY, OF DALLAS, TEXAS.

TRACTION BAND.

1,419,533.

Specification of Letters Patent. Patented June 13, 1922.

Application filed August 1, 1921. Serial No. 488,852.

*To all whom it may concern:*

Be it known that I, BRODIE H. ASHBY, a citizen of the United States, residing at Dallas, in the county of Dallas and State of Texas, have invented certain new and useful Improvements in Traction Bands, of which the following is a specification.

This invention relates to new and useful improvements in traction bands.

The object of the invention is to provide a traction band particularly adapted for application to the wheels of lawn mowers and other machines having ground wheels. A particular object of the invention is to provide a traction band of a highly improved type and capable of being manufactured in an expeditious and economical manner.

A still further object of the invention is to simplify the traction band and make the same practical and durable. One of the features of the invention is to corrugate the studs and the metal band in such a manner that the studs cannot be accidently or unintentionally displaced from their position on the band while in use.

A preferred form of the invention involves studs which are frictionally held in upset sockets on the band and which may be readily removed from the band and sockets by tapping with a hammer or other tool, thus making the studs readily replaceable and interchangeable. However, it is to be understood that the invention is not to be limited to this particular form and may be carried out in various other ways as is hereinafter described.

A construction designed to carry out the invention will be hereinafter described together with other features of the invention.

Figure 1:
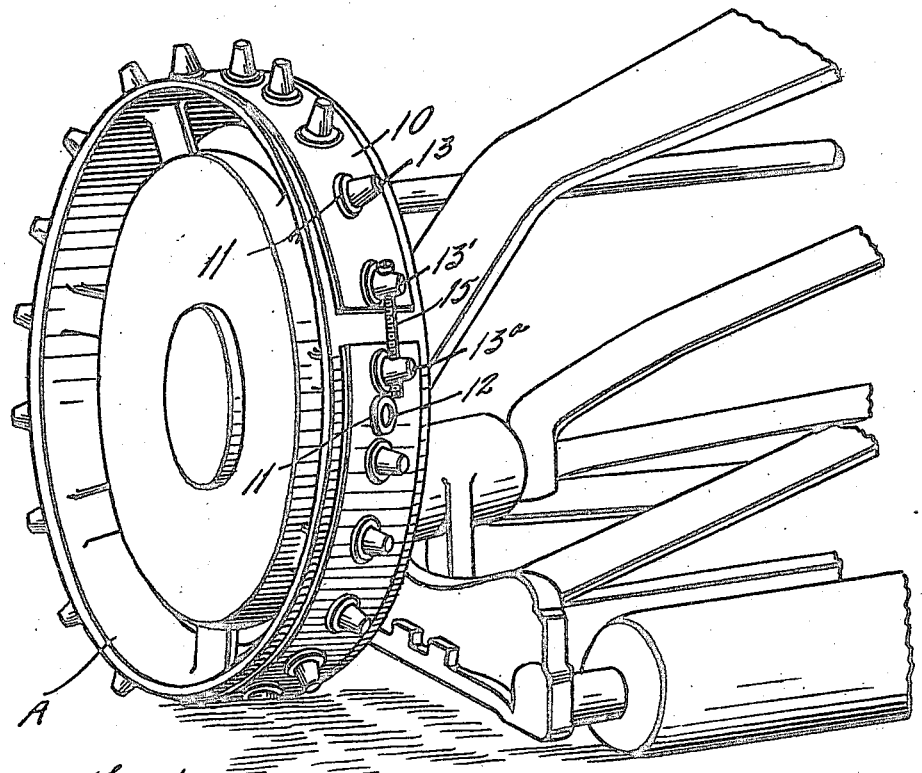
Figure 2:
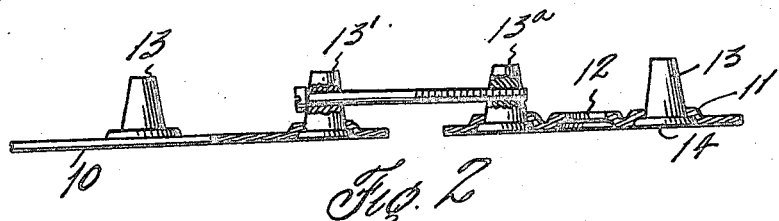
Figure 3:

The invention will be more readily understood from a reading of the following specification and by reference to the accompanying drawings, in which an example of the invention is shown and wherein:

Fig. 1 is a fragmentary perspective view of a lawn mower, showing a traction band constructed in accordance with my invention and applied to one of the wheels thereof, Fig. 2 is a sectional detail of a portion of the traction band showing the manner of fastening the ends of the band together, Fig. 3 is a sectional detail of a modified form of the traction band, Fig. 4 is a similar view of another form, Fig. 5 is a plan view of a portion of a modified form of band, Fig. 6 is a side elevation showing the studs applied to the band illustrated in Fig. 5, Fig. 7 is a detail of a still further modification in which the band is fastened directly to the lawn mower wheels, Fig. 8 is a plan view of a modified form of fastening of the ends of the band, and Fig. 9 is a sectional detail of the same.

In the drawings the numeral 10 designates an elongated metallic band or strip which is preferably, but not necessarily, formed of a flat piece of spring steel or other metal capable of being formed into a traction band in accordance with the invention.

The invention includes a suitable means of fastening this band around the wheel of a lawn mower or other small machine and radial studs extending from the band. It is obvious that these studs may be formed in various manners, either from the band itself or separate therefrom and attached thereto; also that the band may be fastened on the wheel in a number of different ways. In view of this I have illustrated several structures involving the invention.

In Figs. 1 and 2 I have shown a band employing upset sockets 11 projecting from its outer surface and each having a central aperture 12. Frusto-conical studs 13 are formed with enlarged flanged bases 14. These studs are preferably formed of a hard tough metal capable of resisting wear and fracture.

The studs are adapted to be driven through the apertures 12 so that their bases are received in the sockets 11 and have their undersides substantially flush with the inner surface of the band. By this arrangement the bases of the studs will bear on the tread of the wheel A when the band is fastened therearound.

The studs are of such diameter just above their bases as to frictionally engage in the apertures 12 and to hold this engagement with such firmness as to require a slight blow from a hammer to dislodge them from the sockets. This permits of the studs being knocked out of the sockets when desired and affords a quick and efficient means of fastening the studs on the band.

As before stated various means for fastening the band on the wheel A may be employed. In Figs. 1 and 2 I have shown one of the studs 13′ provided with a smooth perforation and the other 13ª being provided with a screw-threaded perforation. A connecting and tightening screw 15 is passed through the apertures with its head engaging the stud 13′ and its threads screwed into the aperture of the stud 13ª.

The studs 13 are spaced at regular intervals and the stud 13′ is placed at one end of the band at the same spacing as the studs 13. The opposite end of the band is provided with two or more of the sockets 11, spaced closer together than those between the studs 13.

The band is made long enough to surround the largest size of wheel and when it is to be applied to a smaller, the stud 13ª may be driven out of its socket and inserted in the next socket; the end of the band and socket from which the stud is removed being clipped off. If a still smaller adjustment is required the end of the band bearing the stud 13′ may be clipped off until the band is of the right length; the end stud 13 may then be driven out and the stud 13′ driven into its place. By tightening the screw 15 the studs at the ends of the band are drawn together and thus the band is fastened around the wheel.

The particular shape of the studs is advantageous, but the invention is not to be limited thereto. By truncating the studs, the otherwise sharp points are elimated and a more durable stud, which is less injurious to concrete, brick and board walks, is had. A tapered stud will enter and withdraw from the sod with less injurious effects and will not tend to pull up the grass.

In Fig. 3 I have shown the band formed with frusto-conical studs 20 struck up from the band and formed integral therewith. Instead of driving the studs into the band sockets 11, studs 30, as shown in Fig. 4, may be riveted in said sockets. Each stud 30 is provided with a reduced depending shank 31 which is inserted through the aperture 12 from the outer side of the band. The inner end of the shank is upset to form a head 32 in the socket.

In Figs. 5 and 6 another form of stud 40 is set forth. The studs 40 each have a pair of prongs 41 projecting from their undersides. The band 10 is provided with slots 42 instead of the sockets. The slots are arranged in pairs and spaced so as to receive the prongs which latter are clinched under the band.

Instead of using the fastening shown in connection with Figs. 1 and 2, the band 10 could be fastened on the wheel A by means of bolts 50, Fig. 7, passing through holes 51 formed in the rim of the wheel and held by nuts 52 on the inside of the rim. In this case the band could be made continuous or the ends suitably fastened together.

Another means of fastening is illustrated in Figs. 8 and 9 and is particularly adapted for a band having slots, as the slots 42, although the bands shown in Figs. 3 and 4, could have slots at their ends. A lug 60 formed with a smooth aperture is provided with a depending hook 61 adapted to engage in a slot 62 in one end of the band 10. A companion lug 63 is provided with a screw threaded aperture and has at its inner end a depending hook 64. The hook 64 is engaged in one of a plurality of slots 65 in the opposite end of the band. A connecting screw 66 passes through the aperture of the lug 60 and engages in the threaded aperture of the lug 63, whereby the lug and ends of the bands are drawn together. Various other fastenings are possible.

The advantages of my improved traction band are many. The structures illustrated are well suited to a practical manufacture and commercializing of the invention. It is obvious that wheels equipped with my traction bands, will have sufficient traction under substantially all conditions. A lawn mower equipped with these bands will cut high grass and operate on terraces, without a great expenditure of labor and without the usual shuttle operation. Furthermore the studs will not pull out of my band or tilt when in use and the band will be practically indestructible.

Various changes in the dimensions and structure as well as modifications, may be made without departing from the spirit of the invention as claimed.

What I claim, is:

1. A traction band for ground wheels of small machines including, an elongated metallic band having sockets provided with openings, tapered studs engaging in said openings and having enlarged portions seated in said sockets, and means for fastening said band around a ground wheel.

2. A traction band for ground wheels of small machines including, an elongated metallic band having upset sockets provided with openings, tapered studs frictionally engaging in the openings of the sockets and provided with flanged bases seated in said sockets, and means for fastening the band on the tread of a ground wheel.

3. A traction band of the character described including, an elongated metallic band having spaced openings surrounded by upset sockets, tapered studs engaging in said openings and having enlarged heads seated in said sockets, said heads being exposed on the inner side of the band to contact with the tread of the wheel, and means for fastening the ends of the band together and drawing the same taut around the wheel.

In testimony whereof I affix my signature.

BRODIE H. ASHBY.